Aug. 8, 1933.  E. R. DAYTON ET AL  1,921,118
LUBRICATING APPARATUS
Filed May 15, 1929  4 Sheets-Sheet 4

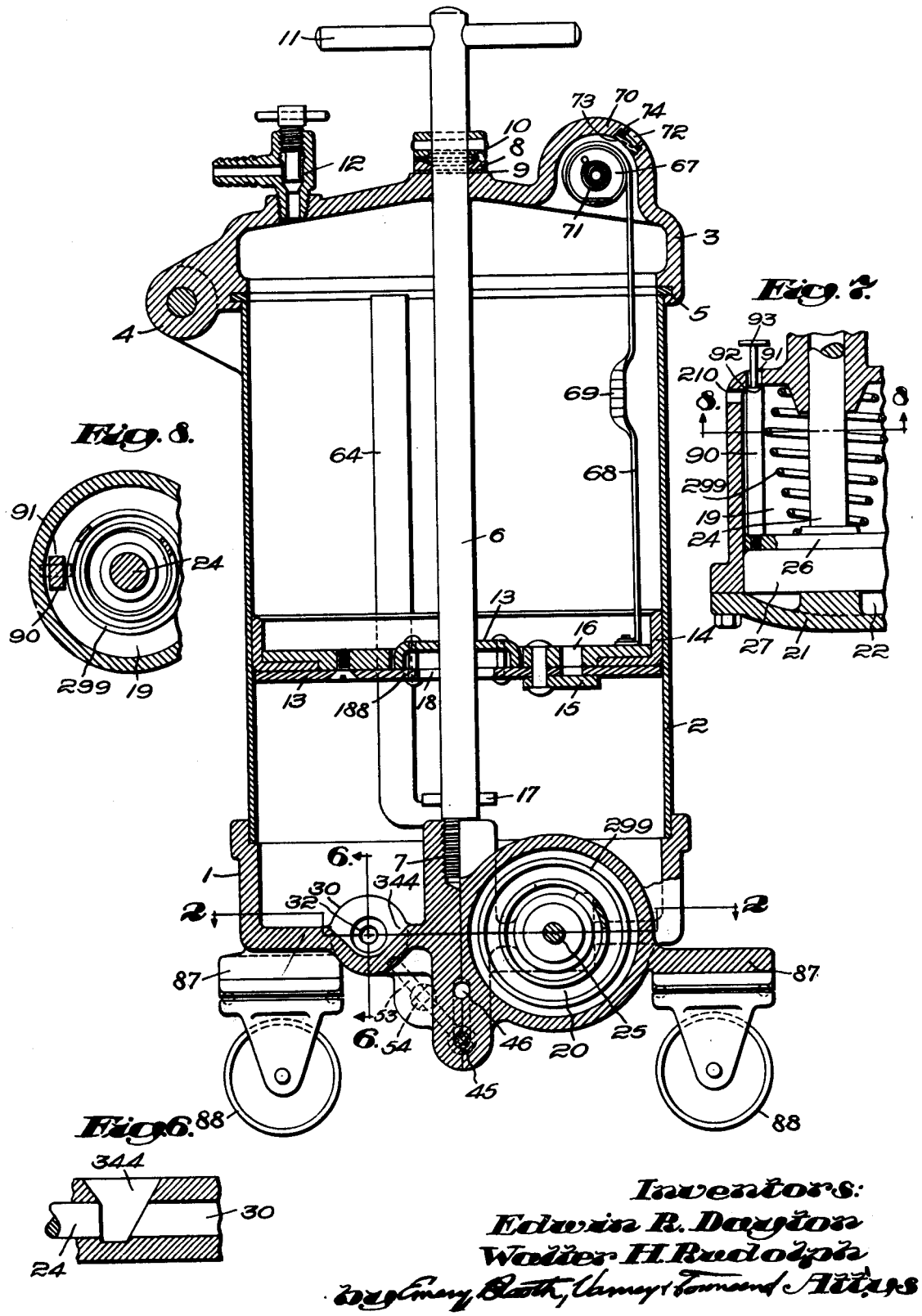

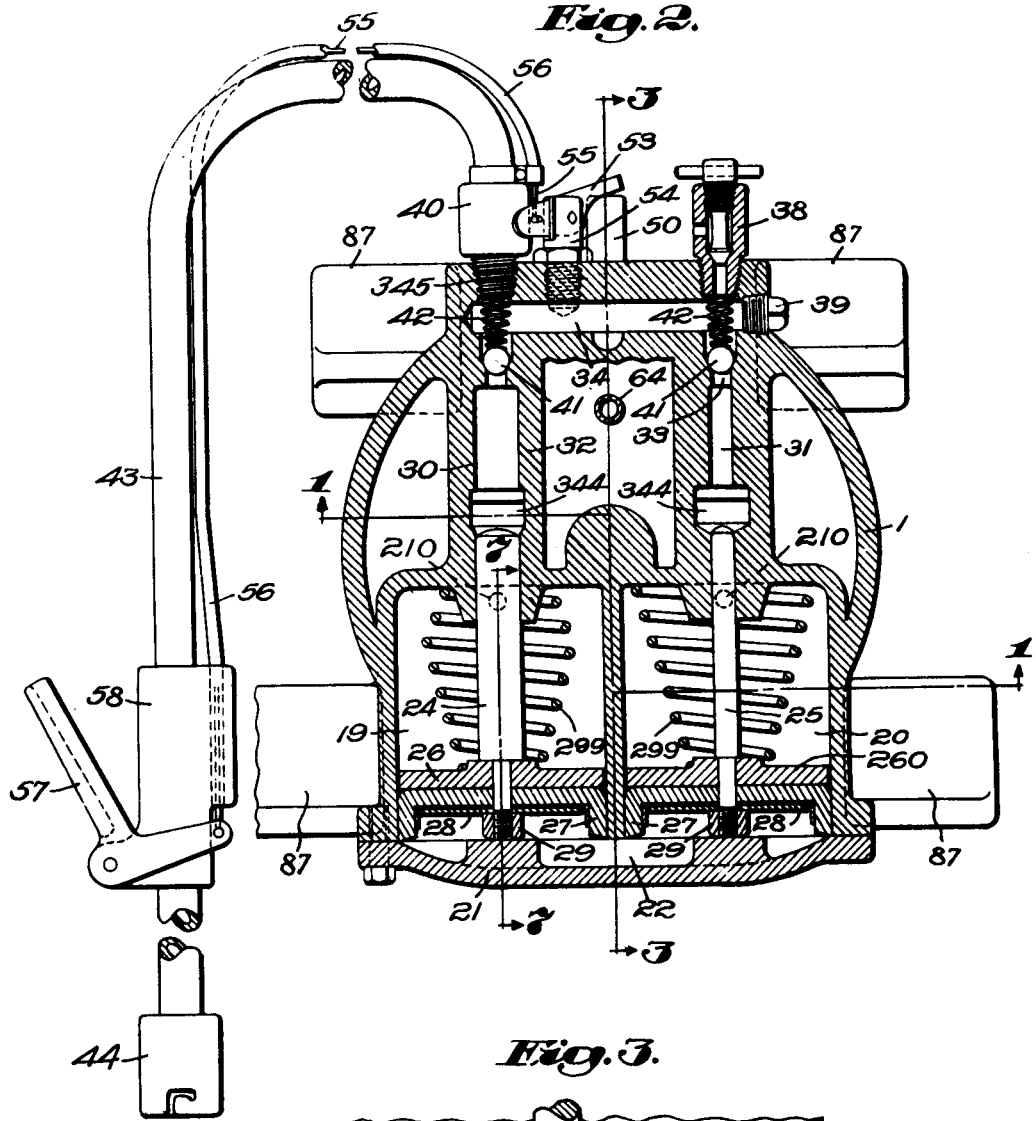
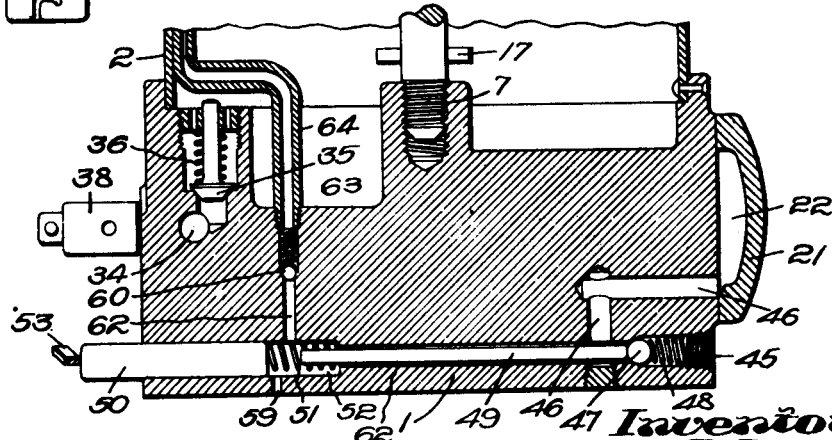

Inventors:
Edwin R. Dayton
Walter H. Rudolph

Patented Aug. 8, 1933

1,921,118

UNITED STATES PATENT OFFICE 1,921,118

LUBRICATING APPARATUS

Edwin R. Dayton, Ashland, and Walter H. Rudolph, Brookline, Mass.

Application May 15, 1929. Serial No. 363,300

24 Claims. (Cl. 221—47.1)

Our invention aims to provide improvements in lubricating apparatus and is particularly directed to improvements in portable tanks adapted to be used for lubricating the bearings of motor vehicles, machinery and the like.

In the drawings which illustrate the embodiments of our invention to be described herein:—

Figure 1 is a vertical cross-section taken through the lubricant container and through the base of the device on the line 1—1 of Fig. 2;

Fig. 2 is a horizontal section taken on the line 2—2 of Fig. 1 and shows the lubricant pumping means, the flexible hose, the coupling member and other details;

Fig. 3 is a vertical section taken on the line 3—3 of Fig. 2 through the base of the device and shows the valve mechanisms and the air inlet and by-pass by which the operation of the device is controlled;

Fig. 6 is a detailed cross-section taken on the line 6—6 of Fig. 1 to show the funnel-shaped irregularity in the base through which lubricant passes from the container to a lubricant cylinder;

Fig. 7 is a section taken on the line 7—7 of Fig. 2 and shows the means for locking one of the plungers against operation; and Fig. 8 is a section taken on the line 8—8 of Fig. 7, showing the plunger-locking rod in full and dotted positions.

Figure 4:
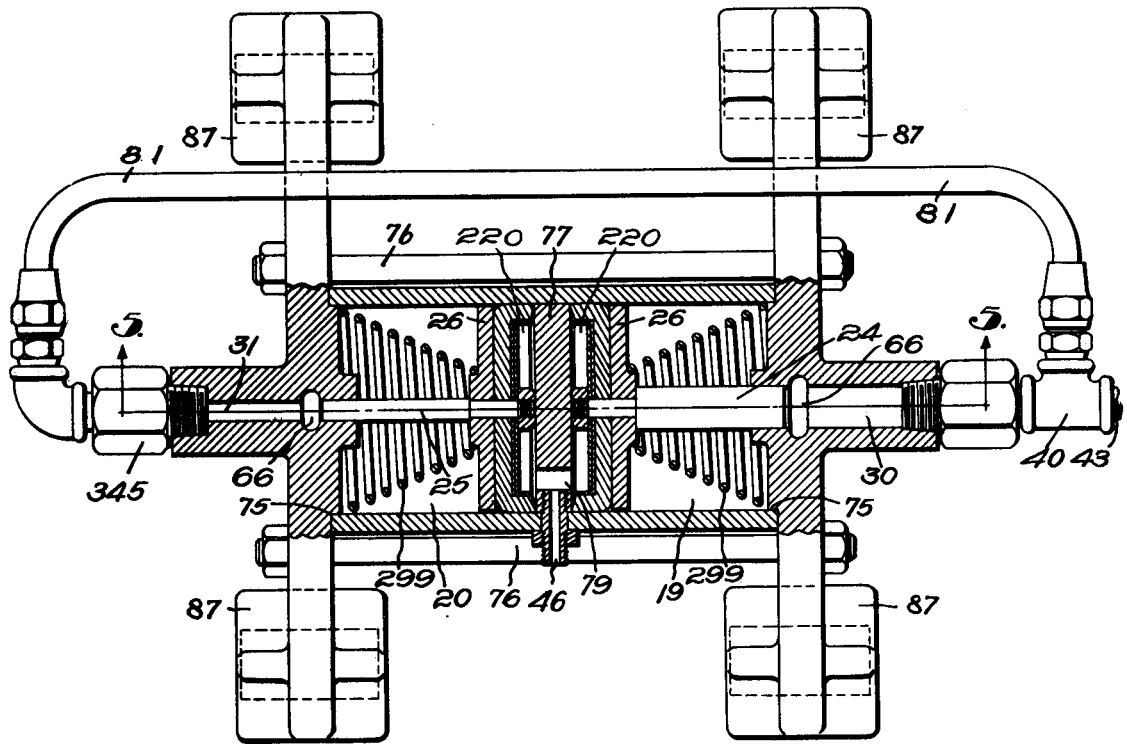
Fig. 4 is a horizontal cross-section taken on the line 4—4 of Fig. 5 and shows a modified form of our device.

Referring to the embodiment of our invention illustrated in Figs. 1, 2, 3, 6, 7 and 8 of the drawings, our novel lubricating apparatus comprises a base 1 supporting a lubricant container 2 of suitable size and construction. The container 2 is provided with a removable top, herein shown as being in the form of a cover 3, hinged to the container at 4 and rendered airtight by a packing 5.

A plunger shaft 6 passes through an opening in the cover 3 and is threaded into engagement with a boss provided on the base 1 and acts as a clamp to draw the cover tightly against the container top and provide an air-tight joint between the cover and container. To accomplish this, the shaft 6 is provided near its upper end with a thrust collar 8 and a gasket 9 located between the collar 8 and the cover 3. The collar 8 is made in two sections and a packing 10 is located between the sections to prevent leakage of lubricant through the collar. The shaft 6 has a handle 11 to facilitate rotation thereof during engagement and disengagement of the inner end 7 with the boss provided on the base 1, as clearly illustrated in Fig. 1.

Figure 5:
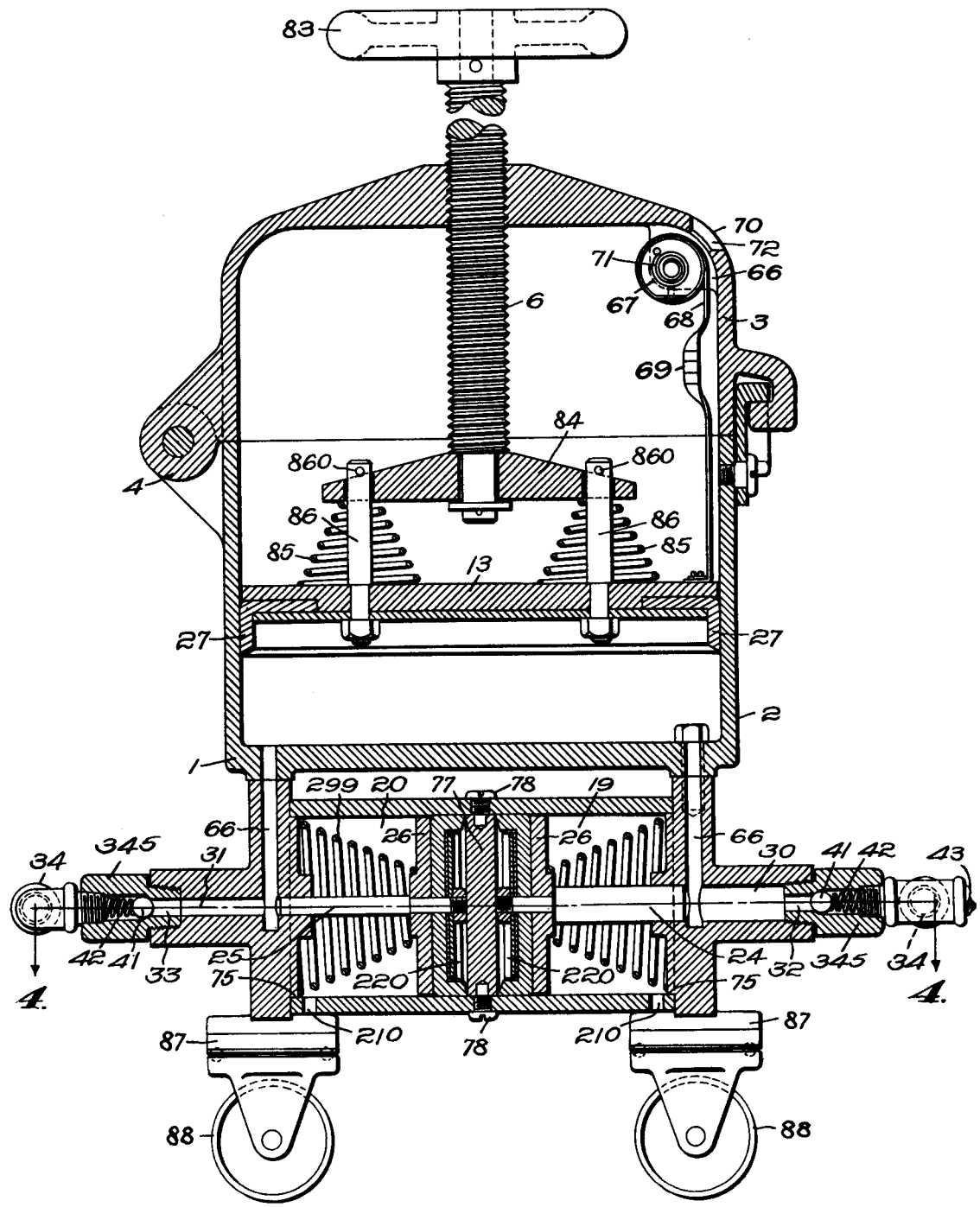
Fig. 5 is a vertical cross-section taken on the line 5—5 of Fig. 4.

A piston 13 is provided in the container 2 whereby the lubricant may be placed under pressure. The means for moving the piston 13 in the container may be mechanical, as shown in Figs. 4 and 5, or fluid-pressure may be used, as provided for in the construction of the device now under consideration. In the device shown in Fig. 1, the piston 13 is operated by means of air or other fluid-pressure admitted through the air valve 12 and as otherwise hereinafter specified. The valve 12 has two functions, viz., to permit introduction of air from any convenient source of supply and to release air from the top of the container when desirable.

The plunger head or piston 13 may be provided with any suitable packing, as the cup washer 14. A check valve 15 is provided in the piston 13 to admit air below it when it is desirable to withdraw the piston from the container. This valve may be in the form of a piece of flexible material, such as leather, riveted to the lower face of the piston to cover the air passage 16 therethrough and act automatically to admit air below the piston when the piston is moved upwardly, as viewed in Fig. 1. The details of construction of the piston 13 are not important, and it should be understood that any suitable piston may be used.

The lower end of the shaft 6 is provided with a pin 17 which, when the shaft is drawn upwardly, engages the piston 13, thereby making it possible to move it to the cover 3 and permit filling of the container with oil or grease or for any other purpose when desired. A slot 18 in the flange 188 of the piston 13 will permit the pin 17, carried by the shaft 6, to pass through it and by a partial turn of the shaft to be used to force the plunger downwardly thereby initially to expel the air trapped between the surface of the lubricant and the piston 13.

In the particular embodiment of our invention illustrated in Figs. 1, 2, 3, 6, 7 and 8 the base 1 is made in such a manner as to accommodate lubricant pumping means by which lubricant from the container is pumped under pressure in a manner more fully and specifically hereinafter described. The base is provided with two lubricant pressure cylinders 30 and 31, respectively, which are of different cross-sectional areas. Into the pump means we have fitted plungers 24 and 25 of suitable cross-sectional areas to fit the corresponding cylinders 30 and 31, as illustrated in Fig. 2.

Adjacent to the ends of the cylinders 30 and 31 the base 1 of the container is irregularly formed in such a way as to cause lubricant in the container to lie across the open end of the lubricant cylinders 30 and 31, thereby eliminating the use of ports, conduits, passage ways or ducts in which air pockets could be formed and which would offer resistance to the passage or flow of heavy grease into the cylinders, as is frequently the case in devices now in common use. These irregularities are preferably funnel-shaped and are designated by the numerals 344—344, as shown in Figs. 1 and 6.

The base 1 is also provided with air cylinders 19 and 20 which are axially aligned with the lubricant cylinders 30 and 31, respectively, and which are of substantially larger cross-sectional area to accommodate pistons 26 and 260, respectively, to which the plungers 24 and 25, respectively, are attached, as clearly illustrated in Fig. 2. The plungers and pistons described provide combined differential plungers whereby the unit pressure exerted upon the lubricant by the plungers is substantially increased over the unit pressure exerted upon the pistons. Each of the air pistons is provided with suitable packing means such as a cup washer 27 secured in position by a plate 28 and a nut 29, the nut being threaded to the end of a lubricant plunger.

In Figs. 2 and 7 we have shown ports 210 opening the forward ends of the air cylinders to the atmosphere. The main purpose of the ports 210 is to release air that is displaced by the pistons 26 and 260 in their inward travel and to admit air during their return. These ports 210 also release any air or lubricant which may leak into the inner ends of the cylinders.

The cylinder 30 has a discharge passage 32 and the cylinder 31 has a discharge passage 33 and both of these passages have check valves 41 normally held in passage-closing positions by springs 42. The passages 32 and 33 lead into a common discharge chamber 34 from which lubricant may be conveyed through a suitable flexible hose (Fig. 2). The hose 43 is secured to the base 1 by means of a fitting 40 threaded into a tapped hole 345 communicating with the chamber 34. At the other end of the hose 43 we have shown a coupling 44 which may be of any suitable construction whereby coupling engagement may be made with lubricant-receiving nipples or cups secured to bearings to be lubricated.

A relief valve 35 (Fig. 3) is provided between the chamber 34 and the container 2. If at any time the pressure of the lubricant in the chamber 34 exceeds that for which the valve is set, the valve will permit the lubricant to discharge back into the container. This valve 35 is normally closed by a spring 36.

A valve cock 38 (Fig. 2) connects the chamber 34 with the atmosphere so that the pressure may be relieved in the hose if necessary to permit the operator to disconnect the coupling 44 from the lubricant-receiving nipple.

The plug 39, threaded into the base at one end of the chamber 34, Fig. 2, is provided to permit cleaning of the chamber 34 at any time such action is necessary.

While any suitable means may be used for moving the differential pistons to force lubricant from the cylinders 30 and 31 to the chamber 34, we have preferred to provide means whereby the pistons and plungers may be operated in one direction by air pressure and in the opposite direction by springs 299. The air pressure for operating the pistons 26 and 260 is supplied from any suitable source through a conduit (not shown) adapted to be connected to the screw-threaded aperture 45 provided in the base 1. Said aperture communicates with a valved passageway 62 in which, as shown in Fig. 3, a valve 47, normally closed by the spring 48, prevents passage of air, except when it is desired to pump lubricant. An air passage 46 leads from the valved passageway 62 to a chamber 22 provided between the head 21, which closes both of the air cylinders, and the base 1. This chamber 22 connects both of the air cylinders 19 and 20, as clearly shown in Fig. 2. Control of the air to the chamber 22 is effected by means of a push rod 49 located in the passageway 62 and operable in one direction to unseat the valve 47 by a sliding valve member 50 located in a valve chamber 52 formed as an enlargement of one end of the passageway 62. A spring 51 seated within the valve chamber 52 normally urges the inner end of the valve member 50 away from the adjacent end of the push rod 49 and holds the outer end of said valve member in contacting engagement with one end of a rocker arm 53, presently to be described. The sliding valve member 50 may be connected directly with the push rod 49, if desirable, and is preferably operated in one direction by a valve control handle 57 pivoted upon a sleeve 58 (Fig. 2) preferably attached to the hose 43 adjacent to the coupling 44. The pivoted control handle 57, may, as shown, be in the form of a two-armed or bell crank lever, to the end of one arm of which is connected one end of a flexible wire 55. The latter passes through a flexible tube 56 carried by the hose 43 and the other end of said wire is connected to one end of a rocker arm 53 pivoted upon a post 54 screwed into the base 1. The other end of the rocker arm 53 is adapted to engage the outer end of the sliding valve member 50.

In order to maintain a substantial pressure upon the top of the piston 13 in the container 2, we have provided means whereby some or all of the air used to operate the differential pistons may be by-passed to the container upon the return strokes of the pistons 26 and 260. In Fig. 3 we have shown a tube 64 attached for communication with a lateral branch of the passageway 62 and extending upwardly and then outwardly against the side of the tank and upwardly past the outer periphery of the piston 13, as shown in Fig. 1, it being understood that the latter is suitably notched to permit the passage of the tube. A spring-pressed one way valve 60 is located in the lateral branch of the passageway 62 to prevent return of air from the top of the container. A vent 59 (Fig. 3) is provided to permit escape of any excess of air under pressure and permit full return of the lubricant plungers and air pistons. The operation of the various valves and air passages just described will be more fully set forth in connection with a description of the operation of the device.

We have found that some bearings require a smaller quantity of lubricant than others and even the average bearing and, therefore, it is desirable to provide means whereby one of the lubricant plungers and its corresponding air piston may be locked against operation, so that the other piston and air plunger will be actuated to force a smaller quantity of lubricant under pressure to a bearing. This may be done in various ways, as will be understood by any one skilled in the art, as, for instance, by providing means for controlling the air pressure so that it is admitted to one instead of both of the air cylinders. However, for the purposes of illustration we have shown in Fig. 2 a mechanical arrangement for locking the plunger 24 and piston 22 against operation when desirable. In this connection, we have provided a rod 90 (Fig. 7) attached directly to the piston 26 and passing through an opening 91 in the wall of the cylinder. During normal operation of the device this rod 90 (shown as rectangular in cross-section) passes back and forth through the rectangular opening 91, but when it is desirable to lock the piston 26 against operation the rod 90 may be rotated ninety degrees, so that the shoulder 92 will bear against the wall of the cylinder, as shown in dotted lines (Fig. 8) and prevent passage of the rod through the opening 91. Rotation of the rod may be accomplished by means of the handle extension 93 which normally extends outside of the cylinder casing and can be reached conveniently beneath the base 1.

In order that the operator may know how much lubricant remains in the container, or how much lubricant is consumed during the lubricating of the bearings of a certain machine or motor vehicle, we have provided a gauge which comprises a wheel or pulley 67 located in a dome 70 provided in the cover 3, as shown in Fig. 1. An inscribed flexible tape 68 is wound around the pulley 67 and has one end connected to the piston 13 in the container. A spring 71 normally acts to rotate the pulley in one direction and maintain the flexible tape under tension to provide an accurate reading through the opening 72 in the dome 75. This opening 72 is closed by a piece of transparent material, such as heavy glass 73, cemented in place and resting against a cushion 74, so that the air pressure in the tank will tend to force the glass outwardly against the cushion 74 to form a seal and prevent leakage around the opening. In Fig. 1 a portion of the tape 68 is shown distorted or turned to the plane of the paper thereby to show the graduations 69.

Any suitable means may be provided whereby the lubricating device or tank may be readily moved about to provide for portability and in this connection we have shown castors 88 attached to bosses 87 provided as a part of the base 1.

When liquids or semi-liquids are used, the suction of the lubricant plungers is sufficient to draw in the lubricant from the container 2, in which case the piston 13 then merely acts as a follower plate and no mechanical or fluid pressure actuating means are required for such piston. The mechanical and fluid pressure means, together with the funnel-shaped openings 344, are provided to facilitate the operation of the device in the use of heavy, "fibrous" or viscous greases.

Having thus far described various elements of our invention, as illustrated in Figs. 1, 2, 3, 6, 7 and 8, we shall now proceed to a description of the operation of the device.

Assuming that the container has been provided with a supply of lubricant, air under pressure may be admitted to the top of the container through the valve 12 and after this valve is closed the compressed air in the container will automatically press the lubricant downwardly and it is not necessary to maintain direct connection to the source of air pressure supply as is true with other well-known tanks of the same class. Now that the air pressure has been supplied to the top of the piston, the device is ready for operation and the operator first secures the coupling 44 (Fig. 2) to a lubricant-receiving nipple attached to a bearing (not shown) and presses the control handle 57, thereby to move the rocker arm 53 about its pivot and press the sliding valve member 50 (Fig. 3) inwardly to cover first the port 59 and then that portion of the by-pass 62 which communicates with the tube 64 so that no air may escape or pass to the top of the tank when the valve 47 is open. Upon continued inward movement of the sliding valve member 50 it will engage the push rod 49 which, in turn, will unseat the valve 47 against the action of the spring 48. This action will permit air to pass into the passage 46 and then into the chamber 22 connecting the two valve cylinders 19 and 20. If the bearing to be lubricated is free and does not require any substantial amount of pressure to permit proper lubrication, the air pressure admitted to the chamber 22 will act upon both of the plungers 26 and 260 and move them against the action of the springs 299 to force the plungers 24 and 25 forward into their cylinders 30 and 31. As the plungers 24 and 25 enter the cylinders 30 and 31 the supply of lubricant from the container to the lubricant cylinders 30 and 31 is cut off and from then on a predetermined amount of lubricant is forced from each cylinder past the valves 41 and into the chamber 34 from whence it passes through the hose 43 to the bearing which is being lubricated.

Assuming that a "frozen" bearing is encountered and a higher pressure is required to be exerted upon the lubricant to free the bearing than is normally obtained or that may be exerted by the larger plunger 24, the operation of the device will be as follows. When the valve 47 is unseated and air pressure rushes into the chamber 22 both pistons 26 and 260 will be initially moved forward. If the resistance offered by the bearing is greater than the pressure which the large diameter, large volume, low pressure plunger 24 is able to generate the small diameter plungers 25 will continue to function and create a substantially higher pressure which will usually free the bearing. As soon as the bearing is free high pressure will no longer be required and the air pressure upon the pistons 26 and 260 will complete the operating stroke of the plunger 24 as well as the plunger 25, so that the predetermined quantity of lubricant is forced to the bearing after it has been freed by the automatic increase of the pressure in the manner just described. Thus, we have provided a device which has lubricant pumping means automatically operable to lubricate with a predetermined amount of lubricant any bearing whether it requires merely a low pressure to supply the lubricant or requires a relatively high pressure first to free the bearing before the desired quantity of lubricant may be supplied.

After the pistons 24 and 25 and plungers 26 and 260 have been moved forward in their cylinders to expel lubricant, the operator will release his hold on the control handle 57 and the supply of air will be automatically cut off from the chamber 22 by the closing of the valve 47. After the valve 47 is closed and the sliding valve member 50 is returned by the combined action of the air and the spring 51 to uncover that portion of the by-pass 62 leading to the tube 64, the air under pressure will rush past the valve 60 into the tube and be conveyed above the piston 13 into the container to increase the air pressure in the top of the container. As the sliding valve uncovers the port 59 to the atmosphere the air under pressure in the passageway 62 and in chamber 22 will be relieved thereby permitting return of the air pistons 26 and 260 under the influence of the springs 299 and withdrawal of the plungers 24 and 25, from the cylinders 30 and 31. By conveying the air from the chamber 22 to the top of the lubricant container 2 after each operation of the lubricant discharge plungers 24 and 25, we provide for automatic maintaining of air under pressure above the piston 13 in the container, so that as the lubricant is used sufficient air pressure will be supplied to maintain a pressure on the piston 13.

If the operator encounters a bearing which requires only a small amount of lubricant, he may stop the action of the plunger 24 and prevent its expelling any lubricant by merely turning the handle 93, thereby to rotate the rod 90 (Figs. 7 and 8) attached to the piston 26 and lock the shoulder 92 with the wall of the cylinder 19. Then, as air is admitted to the chamber 22, it will actuate the piston 260 only and thereby expel that quantity of lubricant only which is supplied to the cylinder 31. In this manner all of the lubricant which otherwise would have been expelled from the cylinder 30 is saved because if the device were operated normally it would supply much more lubricant to the bearing than is necessary and the extra lubricant would merely be wasted. Furthermore there will be a saving of air.

Referring now to that form of our invention illustrated in Figs. 4 and 5, we have shown a device which is adapted to be operated in substantially the same manner as described in connection with the device illustrated in Figs. 1, 2, 3, 6, 7 and 8. This device, however, is a somewhat simplified and less expensive construction because the differential pistons of the pump means are axially aligned and so arranged that a single bore may be used to provide the two air cylinders in which the air pistons are operated. In this construction the air cylinders 19 and 25 are provided by a tubular-shaped housing divided by a partition 77 secured in position by screws 78, as clearly shown in Fig. 5. This cylindrical casing is carried by circular bosses 75 provided on the cylinder-supporting means and are secured thereto by bolts 76 (Fig. 4). An air inlet pipe 46 communicates with the spacers 220 through a passage 79 in the partition 77, so that air may be supplied to the spaces under pressure from any suitable source.

The lubricant cylinder 31 is connected with the discharge connection 40 by means of a by-pass pipe 81 (Fig. 4) so that the lubricant from the cylinder 31 may be forced to the hose 43 at the same time that lubricant is forced from the lubricant cylinder 30.

Instead of operating the piston 13 in the container 2 by air pressure, we have shown a mechanism whereby the piston may be operated manually to feed lubricant from the container. In Fig. 5 we have shown a shaft 6 as being threaded through the cover 3 so that it may be moved longitudinally of the container by rotation of the hand wheel 83. The shaft 6 carries at its lower end a plate 84 from which is suspended and spaced therefrom the piston 13 by means of rods 86. Suitable springs 85 surround the rods 86 and normally maintain the piston 13 in spaced relation to the plate 84. The rods 86 are adapted to slide in openings in the plate 84 and are prevented from passing entirely through these openings by the pins 860. This construction enables us to maintain a continuous pressure on the lubricant for a substantial period by turning the shaft 6 to press the piston 13 against the lubricant and compress the springs 85 between the plate 84 and the piston 13. In this manner the springs 85 will exert a pressure upon the piston 13 until the pins 860 again contact with the plate 84, as shown in Fig. 5.

In the device shown in Figs. 4 and 5 the gauge device is also illustrated and it is believed unnecessary to describe it because the construction and operation is substantially the same as that described in connection with the previously described embodiment of our invention.

Aside from the details of construction and the elimination of the means for by-passing air for operation of the piston 13, the operation of the device illustrated in Figs. 4 and 5 is substantially the same as that illustrated in connection with Figs. 1, 2, 3, 6, 7 and 8 and, therefore, a description of the operation of this device is considered superfluous.

No inwardly opening valve is provided in the coupling 44 and, therefore, there is no pressure on the lubricant in the hose, except when the coupling is engaged with a lubricant-receiving nipple and the pump means is operated to create pressure.

While we have illustrated and described preferred embodiments of our invention, it should be understood that we do not wish to be limited thereby, because the scope of our invention is more fully set forth in the following claims.

We claim:

1. A device of the class described comprising a lubricant container having a lubricant feed piston, means for actuating the same, lubricant containing cylinders in communication with the container, a plurality of pumping devices having plungers of different pressure exerting capacities operable in said cylinders, means for actuating them according to the pressure required to force lubricant from the cylinders and for supplying a predetermined quantity of lubricant to a bearing to be lubricated, and a pressure control and lubricant relief valve for return of lubricant to the container.

2. A device of the class described comprising a lubricant container, pump means for ejecting lubricant from said container to a part to be lubricated at varying pressure depending upon the resistance offered to the flow of said lubricant, said pump means comprising lubricant cylinders communicating with the container, plungers of different cross-sectional area independently movable in said cylinders and means for actuating said plungers to force lubricant from the cylinders to a bearing to be lubricated and one of said plungers free to be actuated independently by said means when the resistance encountered at the bearing exceeds the unit pressure exertable by the other plungers.

3. A device of the class described comprising a base, a lubricant container supported thereon, a lubricant feed piston located in said container, means for actuating the piston, lubricant cylinders provided in the base and communicating with the container, plungers of different sizes operable in said cylinders, means to admit fluid pressure to actuate the plungers, said plunger being mounted for operation by said fluid pressure, independently of each other to force lubricant from the cylinders under pressure, the larger plunger being dimensioned to supply a predetermined quantity of lubricant to a bearing to be lubricated, and the smaller plunger being dimensioned to force the lubricant to the bearing under increased pressure if necessary.

4. A lubricating device comprising, in combination, a lubricant container mounted upon a portable base, a fluid pressure operated piston located in the container for forcing lubricant therefrom, lubricant pumping means carried by the base and adapted to supply lubricant under various potential pressures, said pumping means including lubricant cylinders of different cross-sectional areas, plungers of different cross-sectional areas to fit the cylinders and a fluid pressure cylinder for each of said plungers, a piston slidably mounted in each of said fluid pressure cylinders and operatively connected with its respective plunger, said base being provided with passages for establishing communication between said container and lubricant cylinders, a conduit for admitting fluid under pressure to said fluid pressure cylinders, and a delivery conduit communicating with said lubricant cylinders, to receive lubricant under pressure from the cylinders and to convey it to a bearing to be lubricated.

5. Lubricant apparatus comprising a lubricant container, lubricant pumping means, means for feeding lubricant from the container to the pumping means, said pumping means including plungers to supply lubricant to a bearing, air cylinders and pistons therein for operating the plungers, and means including a by-pass for conducting air from the plunger operating cylinders to the container to feed lubricant therefrom, and an exhaust port of the atmosphere for reducing back pressure on said pumping means to atmospheric pressure.

6. Lubricant apparatus comprising a lubricant container, lubricant pumping means, means for feeding lubricant from the container to the pumping means, said pumping means including plungers to supply lubricant to a bearing, air cylinders and pistons therein for operating the plungers, means including a passageway for conducting the air from the plunger operating cylinders to the container to feed lubricant therefrom, an exhaust port to the atmosphere, and valve means operable independently of said pumping means for controlling the admission of air to said pumping means and for opening said passageway and said exhaust port.

7. Lubricant apparatus comprising a lubricant container, lubricant pumping means, means for feeding lubricant from the container to the pumping means, said pumping means including plungers to supply lubricant to a bearing, air cylinders and pistons therein for operating the plungers, a passageway for permitting the passage of the air from the air cylinders to the container after the air has been used to actuate the said plungers, an exhaust port to the atmosphere, a conduit leading to a source of air under pressure, and communicating with said pumping means, and a sliding valve under manual control for governing the opening of said passageway, said exhaust port and said conduit.

8. In a lubricating device of the class described, a container, means for supplying fluid under pressure to said device, a pair of cylinders connected with said means, a pair of differential plungers independently operable in said cylinders and each being of different pressure exerting effect, means connecting said cylinders and container and an exit conduit common to both of said cylinders.

9. In a lubricating device of the class described, a container, means for supplying fluid under pressure to said device, a pair of cylinders connected with said means, means connecting said cylinders and container, a pair of differential plungers operable in said cylinders and each being of different pressure exerting effect, an exit conduit common to both of said cylinders, and means to lock one differential plunger against operation when desired to reduce the quantity of lubricant to be forced to the exit conduit.

10. In a lubricating device of the class described, a container, means for supplying fluid under pressure to said device, a pair of cylinders connected with said means, means connecting said cylinders and container, a pair of differential plungers operable in said cylinders and each being of different pressure exerting effect, an exit conduit common to both of said cylinders, and means comprising a part carried by one of the differential plungers and adapted to lock one differential plunger against operation when desired to reduce the quantity of lubricant to be forced to the exit conduit.

11. A lubricating device comprising, in combination, a lubricant container, pump means for discharging lubricant from said device under different potential pressures, comprising two or more independently operable plungers of different cross-sectional area operating in cylinders, suitable conduit means connecting the cylinders in parallel with the lubricant container and outlet means through which the lubricant may be forced from the said cylinders.

12. In a lubricating apparatus of the class described, a lubricant container, pumping means in communication with said lubricant container, said pumping means having multiple cylinders, and differential pistons of different cross sectional areas operable in said cylinders, whereby said differential pistons are of varying pressure-producing capabilities.

13. In a lubricating apparatus, a pair of lubricant ejectors, one having a greater potential pressure exerting effect than the other, and an outlet conduit common to and in communication with both ejectors whereby a greater or lesser pressure will be exerted in said conduit in accordance with the resistance offered to the flow of the lubricant therethrough.

14. In a lubricating apparatus, a pair of lubricant ejectors, actuating means for yielding effect common to both of said ejectors and an outlet conduit also common to both of said ejectors, each of said ejectors being movable independently of the other, whereby that one of said ejectors which offers the least resistance to its movement by said actuating means will be initially moved before the other of said ejectors is moved.

15. In a lubricating apparatus, a pair of independently operable lubricant ejectors, each comprising a cylinder and a piston and actuating means therefor, one of said ejectors having a greater potential pressure exerting effect and a smaller volumetric capacity than the other, and an outlet conduit common to both ejectors whereby a greater or lesser pressure and volume of flow of the lubricant through said conduit will occur in accordance with the resistance offered to such flow.

16. In a lubricating device, a lubricant container, lubricant pumping means, means for feeding lubricant from said container to said pumping means, said pumping means including plungers to supply lubricant to a bearing, and air cylinders and pistons therein for operating said plungers, a passageway for permitting the passage of air from said air cylinders to said container after the air has been used to actuate said plungers, an exhaust port to the atmosphere, a conduit connecting said air cylinders with a source of compressed air, and valve means under manual control for first placing said air cylinder in communication with said conduit, then establishing communication between said air cylinders and said passageway and finally for opening said exhaust port.

17. In a lubricating device, a lubricant container, means for maintaining the lubricant in said container under pressure, pump means for discharging the lubricant from said container under different potential pressures, said pump means comprising a plurality of cylinders of different cross sectional area each having an inlet, opening directly into said container, differential plungers slidably mounted in said cylinders, means for operating said plungers; and outlet means through which the lubricant may be forced from said cylinders.

18. In a lubricating device, a lubricant container, means for maintaining the lubricant in said container under pressure, pump means for discharging the lubricant from said container under different potential pressures, said pump means comprising a plurality of cylinders of different cross sectional area, fluid pressure actuated plungers, slidably mounted in said cylinders, and means for operating said plungers, suitable conduit means connecting the cylinders with the lubricant container, and outlet means through which the lubricant may be forced from said cylinders.

19. In a lubricating device, a lubricant container, means for maintaining the lubricant in said container under pressure, pump means for discharging the lubricant from said container under different potential pressures, said pump means comprising a plurality of cylinders of different cross sectional area, a plurality of independently operable plungers of different cross sectional area slidably mounted in said cylinders, suitable conduit means connecting the cylinders with the lubricant container and a common outlet means through which the lubricant may be forced by said plungers from said cylinder.

20. In a lubricating device, a lubricant container, means for maintaining the lubricant in said container under pressure, pump means for discharging the lubricant from said container under different potential pressures, said pump means comprising a plurality of cylinders of different cross sectional area, a plurality of independently operable, fluid pressure actuated, differential plungers of different cross sectional area slidably mounted in said cylinders, suitable conduit means connecting the cylinders in parallel with the lubricant container, and outlet means through which the lubricant may be forced by said plungers from said cylinders.

21. In a lubricating device, a lubricant container, means for maintaining the lubricant in said container under pressure, pump means for discharging the lubricant from said container under different potential pressures, said pump means comprising a plurality of cylinders of different cross sectional area, a plurality of independently operable plungers of different cross sectional area, slidably mounted in said cylinders, means for operating said plungers from the same source of power, suitable conduit means connecting the cylinders with the lubricant container, and outlet means through which the lubricant may be forced by said plungers from said cylinders.

22. In a lubricating device, a lubricant container, means for maintaining the lubricant in said container under pressure, pump means for discharging the lubricant from said container under different potential pressures, said pump means comprising a plurality of fluid pressure and lubricant cylinders of different cross sectional area, a plurality of plungers of different cross sectional area slidably mounted in said lubricant cylinders, means connecting the cylinders with the lubricant container, and outlet means through which the lubricant may be forced by said plungers from said cylinders, a fluid pressure actuated piston operably associated with each of said plungers and slidably mounted in said fluid pressure cylinders, each of said fluid pressure pistons being of larger cross sectional area than its respective plunger.

23. In a lubricating device a lubricant container, pump means associated with said container, said pump means comprising a cylindrical chamber having the entire periphery of a portion of its cylindrical wall cut away to provide a lubricant inlet to said cylinder from said container of greater cross sectional dimensions than said cylinder, the walls of said inlet diverging outwardly both longitudinally and laterally from said cylinder toward said container, to permit heavy grease to flow readily into said cylinder about a portion of its entire periphery and a feed piston mounted for reciprocation within said cylinder and at the limit of its suction stroke lying within said cylinder beyond said inlet and out of the path of lubricant passing to said cylinder through said inlet.

24. Lubricant apparatus comprising a lubricant container, lubricant pumping means, means for feeding lubricant from the container to the pumping means, said pumping means including plungers to supply lubricant to a bearing, air cylinders and pistons therein for operating the plungers, means including a by-pass for conducting the air from the plunger operating cylinders to the container to feed lubricant therefrom, an exhaust port to the atmosphere, and valve means operably associated with said by-pass and exhaust port to control said exhaust port and the admission of air to the container from said air cylinders.

EDWIN R. DAYTON.
WALTER H. RUDOLPH.